(12) United States Patent
Jung et al.

(10) Patent No.: US 9,803,054 B2
(45) Date of Patent: Oct. 31, 2017

(54) HIGHLY FUNCTIONAL POLYAMIDE POLYMER, SPINNING DOPE COMPOSITION CONTAINING SAME, AND MOLDED PRODUCT THEREOF

(71) Applicant: WOOJUNG CHEM. CO., LTD., Gyeongbuk (KR)

(72) Inventors: Jee Won Jung, Gyeongsangbuk-do (KR); Yong Hoon Kim, Daegu (KR)

(73) Assignee: WOOJUNG CHEM. CO., LTD., Gyeongbuk (KR)

( * ) Notice: Subject to any disclaimer, the term of this patent is extended or adjusted under 35 U.S.C. 154(b) by 0 days.

(21) Appl. No.: 14/787,412

(22) PCT Filed: May 12, 2014

(86) PCT No.: PCT/KR2014/004216
§ 371 (c)(1),
(2) Date: Oct. 27, 2015

(87) PCT Pub. No.: WO2014/185671
PCT Pub. Date: Nov. 20, 2014

(65) Prior Publication Data
US 2016/0083515 A1      Mar. 24, 2016

(30) Foreign Application Priority Data

May 13, 2013  (KR) .................. 10-2013-0053614
May 9, 2014   (KR) .................. 10-2014-0055478

(51) Int. Cl.
| C08G 69/30 | (2006.01) |
| C08G 69/32 | (2006.01) |
| C08G 69/26 | (2006.01) |
| C08G 73/06 | (2006.01) |
| C08L 77/10 | (2006.01) |
| C08L 79/04 | (2006.01) |
| D01F 6/60  | (2006.01) |

(52) U.S. Cl.
CPC ........... *C08G 69/32* (2013.01); *C08G 69/265* (2013.01); *C08G 69/30* (2013.01); *C08G 73/0694* (2013.01); *C08L 77/10* (2013.01); *C08L 79/04* (2013.01); *D01F 6/605* (2013.01)

(58) Field of Classification Search
CPC ....... C08G 69/32; C08G 69/265; C08L 79/04; C08L 77/10
See application file for complete search history.

(56) References Cited

U.S. PATENT DOCUMENTS

| 3,541,054 | A |   | 11/1970 | Takeoshi |             |
|-----------|---|---|---------|----------|-------------|
| 3,907,752 | A |   | 9/1975  | Frost    |             |
| 4,018,735 | A |   | 4/1977  | Nakagawa et al. |     |
| 4,021,415 | A | * | 5/1977  | Chang ................ | C08G 63/6856 264/137 |
| 5,292,856 | A | * | 3/1994  | Irwin ..................... | C08G 69/12 528/184 |
| 5,380,818 | A | * | 1/1995  | Oh ........................ | C07C 237/42 428/474.4 |

FOREIGN PATENT DOCUMENTS

| KR | 970007489 B1    | 5/1997  |
| KR | 0171994 B1      | 3/1999  |
| KR | 100744169 B1    | 7/2007  |
| KR | 1020100114767 A | 10/2010 |
| WO | 9703109 A1      | 1/1997  |

OTHER PUBLICATIONS

Choi et al Effects of the nitrile group substitution on the gas separation properties of aromatic polyamide membranes, Jun. 2000, vol. 1, Issue 2, pp. 111-115.*
ISA Korean Intellectual Property Office, International Search Report Issued in Application No. PCT/KR2014/004216, dated Aug. 8, 2014, WIPO, 4 pages.
European Patent Office, Extended European Search Report Issued in Application No. 14798094.0, dated Jan. 30, 2017, Germany, 7 pages.

* cited by examiner

*Primary Examiner* — Gregory Listvoyb
(74) *Attorney, Agent, or Firm* — McCoy Russell LLP (57) ABSTRACT

Provided are a novel polyamide polymer obtained by polymerizing monomers including aromatic diamine substituted with a nitrile group and an amide group and an aromatic dibasic acid compound, a spinning dope comprising the same, and a polyamide molded article. A fiber obtained using the novel polyamide polymer according to the present invention, particularly, a fiber obtained by spinning the polymer according to the present invention may have high strength and high elasticity, such that the fiber may be applied to various industrial fields.

12 Claims, 2 Drawing Sheets

HIGHLY FUNCTIONAL POLYAMIDE POLYMER, SPINNING DOPE COMPOSITION CONTAINING SAME, AND MOLDED PRODUCT THEREOF

CROSS REFERENCE TO RELATED APPLICATIONS

The present application is a U.S. National Phase of International Patent Application Ser. No. PCT/KR2014/004216, entitled "HIGHLY FUNCTIONAL POLYAMIDE POLYMER, SPINNING DOPE COMPOSITION CONTAINING SAME, AND MOLDED PRODUCT THEREOF," filed on May 12, 2014, which claims priority to Korean Patent Application No. 10-2013-0053614, filed on May 13, 2013, and Korean Patent Application No. 10-2014-0055478, filed on May 9, 2014, the entire contents of each of which are hereby incorporated by reference for all purposes.

TECHNICAL FIELD

The present invention relates to relates to a high performance polyamide polymer, a spinning dope composition comprising the same, and a molded article thereof, and more particularly, to a polyamide polymer capable of preparing functional fiber having high strength and high elasticity, and a dope composition comprising the same

BACKGROUND ART

Recently, as fiber has been prominent as a core material in various industrial fields such as a space field, an aircraft field, a shipping industry, building materials, sport goods, and the like, as well as clothing, a demand for high performance fiber capable of being stronger than general fiber for clothes such as nylon, polyester, and enduring high temperature has been increased.

As the high performance fiber, there are carbon fiber, aramid fiber, and the like. The carbon fiber indicates a filament made of non-graphitic carbon obtained by performing of stabilization, carbonation, and stretching graphitization at 250° C. or more on organic fiber or precursor fiber prepared by spinning an organic material such as a resin, a pitch, or the like. The carbon fiber has advantages such as high elastic modulus, high strength, low coefficient of thermal expansion, and high electric and thermal conductivity, but there is still a problem in long-term reliability due to a micropore formation possibility during a preparation process, or the like.

In addition, since the aramid fiber, which is fiber developed by Dupont in the 1970s, has strength of at least two times the strength of the existing fiber, and has a relatively high elongation at break (3~4%) as compared to the carbon fiber having an excellent anti-creping property as well as strength and elastic modulus, the aramid fiber has advantages such as an excellent flexural fatigue property and an impact absorption property, but the aramid fiber is not strong against acid as known from the fact that a strong acid such as sulfuric acid, or the like, is used as a spinning solvent. Therefore, at the time of exposure to outdoor ultraviolet light for a long time, durability of the aramid fiber is not good as compared to general fiber such as polyester fiber, and dyeability may be deteriorated. In addition, since an moisture absorption rate is relatively high (4 to 6%), and in the case in which the aramid fiber is left at a high temperature for a long time, dynamic performance thereof may be deteriorated by hydrolysis, the aramid fiber is disadvantageous for long term preservation and usage.

Further, polyimide containing a monomer substituted by a nitrile group has been disclosed in Korean Patent Application No. 1994-5840 and Korean Patent No. 0171994, but the polyamide is not spun at a high draw ratio, at the time of spinning the polyamide, breakage is frequently generated even at a low draw ratio, and mechanical properties should be further improved. Therefore, practically, it is difficult to commercially use the polyamide.

Therefore, research into a technology of diversifying a fiber product by improving fatigue properties or increasing strength of fiber, or the like, eco-friendly fiber having excellent dyeability or an excellent crimping property, and a preparation method thereof have been continuously conducted.

DISCLOSURE

Technical Problem

In order to solve these problems, the present inventors conducted various studies and found that in the case of polymerizing diamine monomers including an aromatic diamine monomer having primary amide (—$CONH_2$) substituent and an aromatic diamine monomer having a nitrile substituent and a dibasic organic acid derivative monomer including an aromatic dibasic organic acid derivative, the above-mentioned problems may be solved, thereby completing the present invention.

Therefore, an object of the present invention is to provide a spinning dope composition capable of being spun at a higher draw ratio as compared to the related art under mild conditions, and a novel polyamide polymer capable of preparing the spinning dope composition.

Another object of the present invention is to provide a liquid crystal dope of the novel polyamide polymer, particularly, aromatic liquid crystal dope, and a preparation method thereof.

Another object of the present invention is to provide an aromatic amide fiber capable of being spun at a high draw ratio of 15 times or more, preferably 20 times, and more preferably 30 times or more, having excellent spinnability, high strength and a high elastic modulus using a spinning dope composition prepared form the novel polyamide polymer, and a preparation method thereof.

Another object of the present invention is to provide a novel polyamide fiber having excellent dyeability.

Another object of the present invention is to provide a molded article such as an amide fiber, particularly, an aromatic polyamide fiber, or the like, using an eco-friendly method without a complicated process such as a sulfuric acid treatment process, a sulfuric acid neutralization process, and the like.

Technical Solution

In one general aspect, there are provided polyamide polymer prepared by polymerizing polymerization monomers including (a) one or two or more selected from aromatic diamine monomers represented by the following Chemical Formula (1), (b) one or two or more selected from aromatic diamine monomers represented by the following Chemical Formula (2), and (c) one or two or more selected from aromatic dibasic organic acid derivative monomers represented by the following Chemical Formula (3), and a spinning dope composition comprising the same, and a molded article thereof.

$$H_2N—Ar_1(CONH_2)_a—NH_2 \quad \text{(Chemical Formula 1)}$$

$$H_2N—Ar_2(CN)_b—NH_2 \quad \text{(Chemical Formula 2)}$$

$$X—CO—Ar_3—CO—X \quad \text{(Chemical Formula 3)}$$

In Chemical Formulas, $Ar_1$, $Ar_2$, and $Ar_3$ are each independently a substituted or unsubstituted ($C_6$~$C_{34}$) aromatic group or —$Ar_4$—Z—$Ar_5$—, $Ar_4$ and $Ar_5$ are a substituted or unsubstituted ($C_6$~$C_{34}$) aromatic group, Z is a single bond, —C(O)NH—, —NH—C(O)—, —CO—, —COO—, —SO$_2$—, —SO—, or a substituted or unsubstituted ($C_1$~$C_{10}$) straight or branched alkylene group, X is hydroxyl, halogen, or a ($C_1$~$C_4$) alkoxy group, and a and b are each independently integers of 1 to 4.

Preferably, in the monomer represented by Chemical Formula 1, at least one —CONH$_2$ substituent may be substituted at an ortho-position of a primary amine group of the aromatic diamine monomer. More preferably, all of the —CONH$_2$ substituents may be positioned at the ortho-positions of the amine groups of the aromatic diamine monomer.

The aromatic diamine monomer having the —CONH$_2$ substituent represented by Chemical Formula 1 may be used at a content of 0.001 to 50 mol %, preferably 0.01 to 20 mol % of the entire diamine monomers including the monomers represented by Chemical Formulas 1 and 2. As the aromatic diamine of the present invention, a mixture of aromatic diamine substituted with —CONH$_2$ and aromatic diamine substituted with a nitrile group may be used, but in the case of adding another diamine monomer except for the aromatic diamines represented by Chemical Formulas 1 and 2, physical properties of a polymer may be adjusted. This case is also intended to fall with the scope of the present invention.

In the case of further adding another diamine monomer except for the aromatic diamines represented by Chemical Formulas 1 and 2, a molar ratio of the added diamine monomer may be in a range of 0.001 to 0.5, preferably up to 0.3 based on 1 mole of the entire aromatic diamines represented by Chemical Formulas 1 and 2, but the present invention is not limited thereto.

An economical molar ratio of the entire diamine monomers including the diamine monomers represented by Chemical Formulas 1 and 2 and an aromatic dibasic organic acid derivative monomer represented by Chemical Formula 3 may be 1:0.9 to 1.1, but the present invention is not limited thereto.

In the case in which a content of the aromatic diamine monomer substituted with —CONH$_2$ represented by Chemical Formula 1 is more than 50 mol % of a content of the entire diamine monomer, a viscosity may be excessively increased during a polymerization process, heat transfer may be defective, such that it may not be easy to control a reaction, and in the case of preparing a spinning dope using the polymer, since an isotropic dope composition rather than an anisotropic dope composition may be prepared, the spinning may be difficult.

As an example of the polymer, there is a polymer prepared by polymerizing 0.001 to 50 mol % of the aromatic diamine monomer substituted with —CONH$_2$ represented by Chemical Formula 1 and 99.99 to 50 mol % of the aromatic diamine monomer substituted with the nitrile group represented by Chemical Formula 2 with the aromatic dibasic organic acid derivative monomer represented by Chemical Formula 3 at an equivalent ratio.

In the case of polymerization using a mixed monomer of the aromatic diamine monomers represented by Chemical Formulas 1 and 2, another aromatic diamine monomer except for the aromatic diamine monomers represented by Chemical Formulas 1 and 2, and/or aliphatic diamine monomers, at the time of preparing a molded article using the prepared polymer, mechanical properties of the molded article such as mechanical strength, an elastic modulus, or the like, may be adjusted, and in the case of preparing a spin dope, a viscosity may be adjusted.

Further, among the diamine monomers, an aromatic diamine monomer simultaneously substituted with the amide group and the nitrile group may be used in the present invention. That is, as long as the diamine monomer having the nitrile group or amide group, the diamine monomer may be used in the present invention.

A specific example of the aromatic diamine having the amide functional group according to the present invention includes compounds as shown below, but is not limited thereto.

First, an example of the aromatic diamine monomer having the primary amide group as a substituent, represented by Chemical Formula 1 includes compounds as described below, but is not limited thereto.

A is —H, —Cl, —Br, —I, —NO$_2$, —CN, or an alkyl or alkoxy group having 1 to 4 carbon atoms, and B is —CO—, —C(O)NH—, —NH—C(O)—, —COO—, —SO$_2$—, —SO—, or an ($C_1$~$C_{10}$) straight or branched alkylene group.

In addition, an example of the aromatic diamine monomer having the nitrile group as a substituent, represented by Chemical Formula 2 according to the present invention includes compounds as shown below, but is not limited thereto.

A is —H, —Cl, —Br, —I, —NO$_2$, —CN, —CONH$_2$, or an alkyl or alkoxy group having 1 to 4 carbon atoms, and B is —CO—, —C(O)NH—, —NH—C(O)—, —COO—, —SO$_2$—, —SO—, or an (C$_1$~C$_{10}$) straight or branched alkylene group.

In the present invention, as the aromatic dibasic organic acid derivative monomer represented by Chemical Formula 3, one or two or more selected from the dibasic organic acid derivative monomers represented by Chemical Formula 3 may be used without limitations.

Further, in the present invention, a dicarboxylic acid based monomer except for the dibasic organic acid derivative monomers represented by Chemical Formula 3 may be additionally used in addition to the aromatic dibasic organic acid derivative monomer represented by Chemical Formula 3 in order to adjust physical properties. It is most advantageous in view of the physical properties that one or two or more selected from aromatic dicarboxylic acid based monomers represented by Chemical Formula 3 are used, but in consideration of flowability, workability, or the like, another dicarboxylic acid based compound except for the aromatic dicarboxylic acid based monomers represented by Chemical Formula 3 (for example, a dicarboxylic acid based compound that is not substituted with a nitrile group, an aliphatic dicarboxylic acid based compound, or the like) may be added at a content of up to 50 mol %, more preferably, 0.01 to 30 mol % of the entire dicarboxylic acid monomer.

An example of the aromatic dicarboxylic acid based compound represented by Chemical Formula 3 includes terephthalic acid, (C$_1$~C$_4$) terephthalate or terephthaloyl halide, naphthalene dicarboxylic acid, naphthalene dicarboxylic acid halide, isophthalic acid, isophthalic acid halide, diphenyl dicarboxylic acid, and a halide or ester based monomer thereof, and the like. In addition, these monomers may have at least one substituent selected from Cl, Br, I, NO$_2$, or an alkyl or alkoxy group having 1 to 4 carbon atoms, but the aromatic dicarboxylic acid based compound is not limited thereto.

A specific example of another dicarboxylic acid based monomer except for the aromatic dicarboxylic acid based monomers represented by Chemical Formula 3 includes aliphatic dicarboxylic acid such as adipic acid and sebacic acid, alicyclic dicarboxylic acid such as cyclohexane-1,4-dicarboxylic acid, and a halide or ester based monomer thereof, but is not limited thereto.

It is preferable that the monomer in which the primary amide group corresponding to a substituent of the amine group of aromatic diamine represented by Chemical Formula 1 is substituted at the ortho-position of aromatic diamine is included in the polyamide polymer. The reason is not clear but may be that this monomer is polymerized together with the aromatic diamine monomer substituted with the nitrile group, such that a high draw ratio may be achieved due to excellent spinnability of the spinning dope, and particularly, mechanical properties may be significantly improved. An amide linkage formed by polymerization at a back-bone of the polymer reacts with the amide group substituted in aromatic diamine to form a quinazolinone ring represented by the following Chemical Formula 4, which may be one of the reasons. It is thought that in this case, mechanical strength is significantly increased, and spinnability may be significantly improved by an interaction with a nitrile substituent existing in a polymerization unit.

[Chemical Formula 4]

Hereinafter, as an example of the polymer according to the present invention, a polymer represented by Chemical Formula 5 prepared by polymerizing the following aromatic diamine monomer and terephthaloyl chloride will be described in detail.

[Chemical Formula 5]

l or m is a mole fraction of the reacted monomer, a ratio of l and m is 0.001~50 mol %:99.99~50 mol %, and a weight average molecular weight of the polymer is 10,000 to 15,000,000.

The weight average molecular weight is measured by using N,N-dimethyl acetamide (DMAc) containing 0.05M lithium chloride (LiCl) as an eluent, diluting a sample to 0.1 g/L and then injecting the diluted sample, continuously passing through one guard column (PLgel Olexis Guard 50*7.5 mm, Agilent) and two main columns (PLgel Olexis 300*7.5 mm, Agilent) at a rate of 1 ml/min, and then using a refractive index (RI) detector and polystyrene as a standard material.

In addition, although a polymer unit is represented by a single Structural Formula including the Structural Formula for convenience in the present invention, it is apparent to those skilled in the art that actually, in the polymer, the units are randomly polymerized.

Further, in the case of preparing a spinning dope using the polymer represented by Chemical Formula 5, it may be appreciated that the prepared spinning dope includes a structure represented by Chemical Formula 6. The reason is that the primary amide substituent substituted at the ortho-position of aromatic diamine, which is the monomer of the polymer, reacts with the amide group of the backbone of the polymer by polymerization to thereby form the quinazolinone ring.

As a solvent used in a polymerization process of the present invention, any solvent may be used without limitation as long as the solvent may dissolve the monomer or polymer. For example, the solvent may be N,N-dimethyl acetamide (DMAc), N-methyl-2-pyrrolidone (NMP), hexamethyl phosphoramide (HMPA), N,N-dimethyl formamide (DMF), N,N,N',N'-tetramethyl urea (TMU), dimethyl sulfoxide (DMSO), or a mixture thereof, but is not limited thereto.

In the present invention, in the case of injecting an alkali metal carbonate, an alkali metal oxide, an alkali metal hydroxide, an alkali metal hydride, an alkali earth metal carbonate, an alkali earth metal oxide, an alkali earth metal hydride, or an alkali earth metal hydroxide in the polymerization process or preparation process of the spinning dope after polymerization, a viscosity of the polymer may be decreased, such that polymerization may be additionally performed, and flowability may be increased in a category of solid components for preparing the spinning dope, such that the spinning may be smoothly performed. Further, in the case of injecting the salt, when chloride such as terephthaloyl chloride as the aromatic dibasic organic acid derivative monomer is used, hydrochloric acid, which is a side reaction product, may be neutralized.

A specific example of the inorganic salt may include LiCl, $Li_2CO_3$, or the like, but is not limited thereto.

[Chemical Formula 6]

l, n, and m are mole fractions of the polymerized monomers, a ratio of l+n and m is 0.001~50 mol %:99.99~50 mol %, and a weight average molecular weight measured by the above-mentioned molecular weight measuring method is 10,000 to 15,000,000.

In another general aspect, there is provided a spinning dope containing various polymers as described above.

The spinning dope according to the present invention has an advantage that the polymer of aromatic diamine monomers represented by Chemical Formulas 1 and 2 and the aromatic dicarboxylic acid based monomer represented by Chemical Formula 3 has liquid crystal properties, such that the spinning may be smoothly performed. However, in order to adjust spinning properties, liquid crystal properties, processability, or the like, the spinning dope may further contain a monomer except for the monomers represented by the above-mentioned Chemical Formulas.

In addition, even in the case of injecting tertiary amine instead of the inorganic salt or injecting a mixture of the inorganic salt and the tertiary amine, an effect of increasing flowability may be almost equal to that in the case of injecting the inorganic salt, but the inorganic salt may be preferable in that flowability may be sufficiently increased even by a small amount of the inorganic salt.

In the present invention, at the time of preparing the spinning dope, an organic solvent may be further added. For example, as the organic solvent, N,N-dimethyl acetamide (DMAc), N-methyl-2-pyrrolidone (NMP), hexamethyl phosphoramide (HMPA), N,N-dimethyl formamide (DMF), N,N,N',N'-tetramethyl urea (TMU), dimethyl sulfoxide (DMSO), or a mixture thereof may be used, but the present invention is not limited thereto.

In the present invention, a solid content in the spinning dope composition is not particularly limited as long as the spinning or working may be performed, but it is preferable that the solid content is 5 to 30 wt %. As a spinning method and apparatus, a conventional spinning method and apparatus of a fiber may be used, and since the spinning method and apparatus are well known to those skilled in the art, a detailed description thereof will be omitted.

Hereinafter, a polymerization method according to the present invention will be described by way of example.

For example, in the polymerization method of the present invention, first, a solution is prepared by dissolving diamine monomers including aromatic diamine monomers represented by the following Chemical Formulas (1) and (2) in a solvent, and then the prepared solution is cooled. Alternatively, solution preparation and the cooling may be simultaneously performed. Since a reaction by heat generation should be controlled at the time of injecting a dibasic organic acid derivative monomer including an aromatic dibasic organic acid derivative monomer represented by the following Chemical Formula 3, the cooling is performed. In the cooling of the present invention, a cooling temperature is not limited, but may be generally −50~30° C., and preferably −20~10° C. However, the present invention is not limited thereto.

$$H_2N\text{—}Ar_1(CONH_2)_a\text{—}NH_2 \quad \text{(Chemical Formula 1)}$$

$$H_2N\text{—}Ar_2(CN)_b\text{—}NH_2 \quad \text{(Chemical Formula 2)}$$

$$X\text{—}CO\text{—}Ar_3\text{—}CO\text{—}X \quad \text{(Chemical Formula 3)}$$

In Chemical Formulas, $Ar_1$, $Ar_2$, and $Ar_3$ are each independently a substituted or unsubstituted ($C_6$~$C_{34}$) aromatic group or —$Ar_4$—Z—$Ar_5$—, $Ar_4$ and $Ar_5$ are a substituted or unsubstituted ($C_6$~$C_{34}$) aromatic group, Z is a single bond, —C(O)NH—, —NH—C(O)—, —CO—, —COO—, —SO$_2$—, —SO—, or a substituted or unsubstituted ($C_1$~$C_{10}$) straight or branched alkylene group, X is hydroxyl, halogen, or a ($C_1$~$C_4$) alkoxy group, and a and b are each independently integers of 1 to 4.

Then, a solution of at least one selected from aromatic dibasic organic acid derivative monomers represented by Chemical Formula (3) is collectively or dividedly injected, thereby performing polymerization. In this case, the aromatic dibasic organic acid based monomer may be injected as it is or dissolved in a solvent and then injected. At the time of divided injection, an injection amount at each of the division processes is not particularly limited. For example, in the case of dividedly injecting the solution two times, a second injection amount may be about 10 to 90 wt %, but is not limited thereto.

Further, in the case of mixing various diamine and/or dibasic acid monomers in addition to the monomers represented by Chemical Formulas 1 to 3 in order to prepare a copolymer in the polymerization process in the present invention, a reaction may be carried out by raising a temperature. Therefore, a reaction temperature is not limited.

At least one inorganic salt selected from the alkali metal carbonate, the alkali metal oxide, the alkali metal hydroxide, the alkali metal hydride, the alkali earth metal carbonate, the alkali earth metal oxide, the alkali earth metal hydride, and the alkali earth metal hydroxide, or at least one selected from the tertiary amines may be injected and polymerized in the polymerization process and/or after the polymerization process, and the spinning dope may be prepared therefrom.

For flowability, the injection amount of the inorganic salt or the tertiary amine is not particularly limited, but preferably, the inorganic salt or the tertiary amine may be used at a molar ratio of 0.9 to 1.3 based on 1 mol of the diamine monomer. More preferably, the inorganic salt or the tertiary amine may be used at a molar ratio of 1.0 to 1.1. In this case, raw materials may not be wasted.

The solid content (content of the polymer) in the spinning dope is not limited, but may be, for example, 5 to 30 wt %. In addition, the spinning dope may be prepared by injecting the inorganic salt to increase flowability after polymerization or separately injecting an additional solvent.

At the time of preparing the spinning dope, the spinning dope is prepared by grinding the polymer after polymerization, injecting the inorganic salt, and then stirring the mixture, which is a typical example.

In addition, as described in the description of the polymer, the polymer of the spin dope may include a spinning dope composition including the quinazolinone unit.

Hereinafter, additionally, a preparation method of a polymer and a spinning dope according to the present invention will be described in detail.

That is, as an example, the preparation method may include: 1) dissolving aromatic diamine monomers including an aromatic diamine monomer substituted with a primary amide group represented by Chemical Formula 1 and aromatic diamine monomer substituted with a nitrile group represented by Chemical Formula 2 in a polymerization solvent; and 2) preparing a polymer by cooling the solution to −50~30° C. and collectively or dividedly injecting an aromatic dibasic organic acid derivative monomer represented by Chemical Formula 3 while strongly stirring the solution.

The preparation method according to the present invention may further include, in the polymerizing of the polymer, 3) injecting at least one selected from an inorganic salt corresponding to at least one selected from an alkali metal carbonate, an alkali metal oxide, an alkali metal hydride, an alkali metal hydroxide, an alkali earth metal carbonate, an alkali earth metal hydride, an alkali earth metal oxide, and an alkali earth metal hydroxide, and tertiary amines and stirring the mixture together with the polymer at 0~100° C.

In the preparation method according to the present invention, as the organic solvent, N,N-dimethyl acetamide (DMAc), N-methyl-2-pyrrolidone (NMP), hexamethyl phosphoramide (HMPA), N,N-dimethyl formamide (DMF), N,N,N',N'-tetramethyl urea (TMU), dimethyl sulfoxide (DMSO), or a mixture thereof may be used, but the present invention is not limited thereto.

In the preparation method of a spinning dope composition of the polyamide polymer, the aromatic dibasic organic acid derivative monomer is dividedly added in the polymerizing of the polymer (step 2), which is preferable in view of preventing a ultra high molecular weight spinning dope composition that is inappropriate for being spun from being formed by non-uniform polymerization. For example, in the case of dividedly injecting the aromatic dibasic organic acid derivative monomer, the polymerization may be performed by primarily injecting 45 to 55% of the entire injection amount and then injecting the residue later, or the like, but the present invention is not limited thereto.

In the preparation method of a spinning dope composition of the polyamide polymer, step 3) is a process for neutralizing hydrogen halide byproducts generated in step 2) by a polycondensation reaction of the aromatic diamine and the monomers including the aromatic dibasic organic acid derivative monomer (for example, aromatic diacid halide) and increasing flowability. A kind of the inorganic salt is not limited, but particularly, when the inorganic salt was $Li_2CO_3$ or a mixture of $Li_2CO_3$, spinnability of the prepared spinning dope composition of the polyamide polymer was excellent.

Further, after the polymer is prepared from aromatic diamine monomer in which the primary amide group is substituted at the ortho-position of the amine group, structural conversion that the substituted primary amide structure partially reacts with the backbone amide group existing in the backbone of the polymer during a process of stirring the polymer together with $Li_2CO_3$ to thereby be converted into a quinazolinone structure is observed. In this case, it was observed that mechanical strength or a drawing property was further improved.

In another general aspect, the present invention includes all of polyamide fibers or pulp prepared by spinning the spinning dope (composition) as described above, and films and other molded articles obtained by a casting method or another processing method.

As a typical example, the present invention may include a fiber capable of having high strength and high elasticity properties such as significantly high tensile strength of 15 g/d or more, preferably 20 g/d or more and a tensile modulus of 450 g/d or more, preferably 480 g/d due to an increase in flowability. Further, the present invention may include a polyamide fiber capable of being prepared so as to have a significantly thin fineness of 1.5 denier or less, preferably, 1.2 denier or less, and preventing a thread not to be easily cut.

As a spinning method for preparing the fiber using the spinning dope of the present invention, a wet spinning method, a dry spinning method, or dry jet wet spinning method may be used, and the dry jet wet spinning method is preferable, but the present invention is not limited thereto.

In the spinning dope composition of the polyamide polymer, in the case in which the polymer has liquid crystal characteristics, it is preferable that the solid content of the dope is in a range of 5 to 30 wt %, preferably, 10 to 25 wt % since anisotropic optical properties of the dope may be well exhibited.

As a typical example of the polyamide spinning dope having the anisotropic optical properties, there is a polymer including at least one repeating unit represented by the following Chemical Formula 7 or 8.

[Chemical Formula 7]

[Chemical Formula 8]

In Chemical Formula 7 or 8, $R_1$ or $R_2$ may be one selected from compounds represented by Chemical Formulas 9 to 12.

[Chemical Formula 9]

[Chemical Formula 10]

[Chemical Formula 11]

[Chemical Formula 12]

In Chemical Formulas, $D_1$ or $D_2$ is any one selected from —H, —CN, and —$CONH_2$, B is —CO—, —C(O)NH—, —NH—C(O)—, —COO—, —$SO_2$—, —SO—, or a ($C_1$~$C_4$) straight or branched alkylene group, in the case of $R_1$, at least one of $D_1$ and $D_2$ is —$CONH_2$, and in the case of $R_2$, at least one of $D_1$ and $D_2$ is —CN.

It is more preferable that in Structural Formula, the amide group or nitrile group is substituted at the ortho-position. In addition, it is more preferable in view of mechanical properties, or thermal stability and the spinnability that the amide or nitrile group is bound to the backbone in a para-position to thereby exist as a polymer having a linear structure.

In another general aspect, there is provided a molded article of a group consisting of a polyamide fiber, pulp, or film obtained by spinning and coagulating a spinning dope composition of a polyamide polymer having the optical anisotropic property as described above.

The spinning dope composition of the polyamide polymer as the molded article may be spun at a high drawing ratio of 10 or more, preferably, 15 or more at the time of performing a spinning process.

In addition, a fiber prepared using the spin dope as described above may provide a molded article having high strength and high elasticity properties such as tensile strength of 15 g/d or more, preferably 20 g/d or more, and tensile modulus of 450 g/d or more, preferably 480 g/d or more and/or having a fineness of 1.5 denier or less, preferably, 1.2 or less.

Advantageous Effects

A novel polyamide polymer according to the present invention has a structure including a CN functional group and a $CONH_2$ functional group, and a fiber using a spinning dope composition containing the polyamide polymer may have significantly excellent strength and elastic force as compared to a fiber according to the related art.

The fiber may be strong against exposure to UV light, or the like, for a long time due to this structure, and even in the case in which the fiber is used for a long time, dynamic performance of the fiber is not deteriorated by hydrolysis, such that durability may be excellent.

In addition, at the time of spinning using a spinning dope according to the present invention, a draw ratio of 10 or more, preferably 20 or more, and more preferably 30 or more may be implemented, such that a high-glossy fiber may be produced.

In addition, the polymer according to the present invention may be dyed using a dye, such that fibers having various colors may be produced, and the polymer may be applied to various fields requiring high strength and high performance.

BEST MODE

Hereinafter, various advantages and features of the present invention and methods accomplishing thereof will be described through Examples and Comparative Examples. The present invention will become apparent from the following detailed description of Examples and Comparative Examples with reference to the accompanying drawings.

However, the present invention is not limited to the preferred embodiment disclosed herein but will be implemented in various forms. The preferred embodiments make disclosure of the present invention thorough and are provided so that those skilled in the art can easily understand the scope of the present invention. Therefore, the present invention will be defined by the scope of the appended claims. Like reference numerals throughout the description denote like elements. Terms used in the present specification are for explaining Examples and Comparative Examples rather than limiting the present invention.

Hereinafter, a preparation method of a polyamide polymer and a spinning dope composition according to the present invention will be described in detail through Examples.

In the following Examples and Comparative Example, a fineness is an average value of values obtained by measuring a fineness of a single strand 10 times or more using an ASTM D 1577 Option C test method, and tensile strength, elongation, and a tensile modulus are average values of values obtained by measuring tensile strength, elongation, and the tensile modulus of a single strand 10 times or more using a KS K 0327 test method. In addition, a weight average molecular weight was measured by GPC (Agilent Infinity 1260 series). The measurement conditions were as follows. N,N-dimethyl acetamide (DMAc) containing 0.05M lithium chloride (LiCl) was used as an eluent, a sample was diluted to 0.1 g/L, injected, and continuously passed through one guard column (PLgel Olexis Guard 50*7.5 mm, Agilent) and two main columns (PLgel Olexis 300*7.5 mm, Agilent) at a rate of 1 ml/min, and then, the measurement was performed using a refractive index (RI) detector, and polystyrene was used as a standard material.

EXAMPLE 1

Preparation of Polymer and Spinning Dope 10.054 g of 2,5-diaminobenzonitrile (DAN, 75.5 mmol), 0.01143 g of 2,5-diaminobenzamide (DAA, 0.0756 mmol), and 100 mL of DMAc were put into a 250 mL 4-neck round flask equipped with a stirrer under nitrogen atmosphere and then completely dissolved at room temperature. This solution was cooled to 0° C. using an ice bath. After 7.672 g of terephthaloyl chloride (TPC, 37.8 mmol) was added to this solution and stirred for 1 minute, 7.672 g of TPC (37.8 mmol) was additionally added thereto. At this time, while a viscosity was rapidly increased, a gel-type solid was formed within 10 to 20 seconds.

After this gel-type solid was ground using a mixer, 5.585 g of lithium carbonate ($Li_2CO_3$, 75.6 mmol) was added thereto, thereby obtaining a flowable spinning dope composition with silver white gloss within 1 hour while neutralizing HCl generated during a reaction.

GPC (Agilent Infinity 1260 series) was performed on the obtained gel-type solid. The measurement conditions were as follows. N,N-dimethyl acetamide (DMAc) containing 0.05M lithium chloride (LiCl) was used as an eluent, a sample was diluted to 0.1 g/L, injected, and continuously passed through one guard column (PLgel Olexis Guard 50*7.5 mm, Agilent) and two main columns (PLgel Olexis 300*7.5 mm, Agilent) at a rate of 1 ml/min, and then, the measurement was performed using a refractive index (RI) detector. As measurement results (using polystyrene standard), a polyamide polymer having a weight average molecular weight of 4,360,000 g/mol and molecular weight distribution of 6.22 was obtained. As a result of confirming the obtained polyamide polymer using a polarized optical microscope (POM), it may be appreciated that the polymer exhibited a Schlieren texture of a nematic liquid crystal phase. In addition, as a result of measuring a molecular weight by the same method using the gel-type solid before injecting lithium carbonate, a weight average molecular weight was 2,570,000. Formation of polyamide was confirmed using IR and proton nuclear magnetic resonance ($^1$H-NMR). The molecular weight was increased in accordance with injection of the lithium salt, such that it may be appreciated that the viscosity was decreased, and additional polymerization was performed.

Preparation of Polyamide Fiber and Physical Properties Thereof (At the Time of Winding at Draw Ratio of 10)

The spinning dope composition prepared in Example 1 was defoamed while being aged at 55° C. for several hours, filtered using a stainless steel net (100-mesh, 250-mesh, 400-mesh), coagulated in a distilled water bath maintained at about 0 to 10° C. while being extruded and sprayed in an air layer (0.1~3 cm) through a spinneret, and then wound around a roller at a draw ratio of 10. A polyamide fiber was produced by sufficiently washing the resultant with distilled water and drying the resultant at 150° C. The fiber had a fineness of 1.7 denier, tensile strength of 18.0 g/d, elongation of 4.6%, and a tensile modulus (3%) of 451 g/d.

Preparation of Polyamide Fiber and Physical Properties Thereof (At the Time of Winding at Draw Ratio of 30)

The spinning dope composition prepared in Example 1 was defoamed while being aged at 55° C. for several hours, filtered using a stainless steel net (100-mesh, 250-mesh, 400-mesh), coagulated in a distilled water bath maintained at about 0 to 10° C. while being extruded and sprayed in an air layer (0.1~3 cm) through a spinneret, and then wound around a roller at a draw ratio of 30. A polyamide fiber was produced by sufficiently washing the resultant with distilled water and drying the resultant at 150° C. The fiber had a fineness of 1.1 denier, tensile strength of 26.3 g/d, elongation of 3.7%, and a tensile modulus (3%) of 576 g/d.

Figure 1:
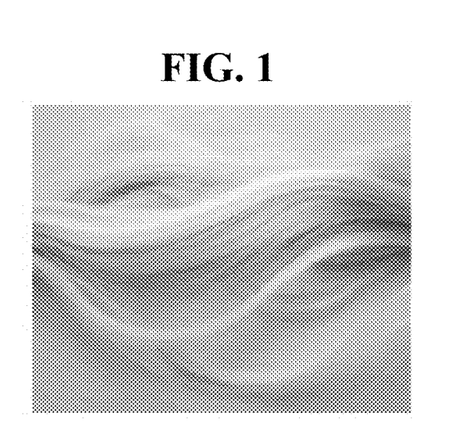
FIG. 1 is a photograph of a fiber filament prepared by spinning a spinning dope in Example 1 according to the present invention.
Figure 2:
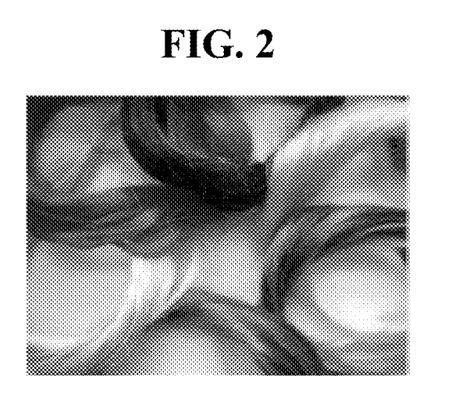
FIG. 2 is a photograph of a dyed fiber filament prepared in Example 1 according to the present invention.

FIG. 1 is a photograph of a fiber filament prepared by spinning the spinning dope composition containing a polyamide polymer in Example 1 at a draw ratio of 30. It may be confirmed that the fiber filament may be drawn at a high draw ratio, and was highly glossy. FIG. 2 is a photograph of dyed fiber filaments prepared by adding various dyes to the spinning dope composition containing the polyamide polymer in Example 1 and spinning the spinning dope composition at a draw ratio of 30. After 1.6 wt % of the dye was added to the dope based on wt % of the polymer of the completed dope and then stirred, filament yarns having various colors may be obtained by performing a spinning process. In the case, as the used dye, acid dyes, basic dyes, reactive dyes, and the like, having various colors may be used. According to the present invention, the fiber may be easily dyed using the dye, such that it may be appreciated that fibers having various colors may be produced.

EXAMPLE 2

Preparation of Polymer and Spinning Dope 10.034 g of 2,5-diaminobenzonitrile (DAN, 75.4 mmol), 0.03428 g of 2,5-diaminobenzamide (DAA, 0.227 mmol), and 100 mL of DMAc were put into a 250 mL 4-neck round flask equipped with a stirrer under nitrogen atmosphere and then completely dissolved at room temperature. This solution was cooled to 0° C. using an ice bath.

After 7.673 g of terephthaloyl chloride (TPC, 37.8 mmol) was added to this solution and stirred for 1 minute, 7.673 g of TPC (37.8 mmol) was additionally added thereto. At this time, while a viscosity was rapidly increased, a gel-type solid was formed within 10 to 20 seconds.

After this gel-type solid was ground using a mixer, 5.585 g of lithium carbonate ($Li_2CO_3$, 75.6 mmol) was added thereto, thereby obtaining a flowable spinning dope composition with silver white gloss within 1 hour while neutralizing HCl generated during a reaction.

As a result of analyzing the obtained gel-type solid by the same method as in Example 1, it may be appreciated that a polyamide polymer having a weight average molecular weight of 3,220,000 g/mol and molecular weight distribution of 5.69 was obtained, and as a result of confirming the obtained polyamide polymer using a polarized optical microscope (POM), it may be appreciated that the polymer exhibited a Schlieren texture of a nematic liquid crystal phase.

Preparation of Polyamide Fiber and Physical Properties Thereof (At the Time of Winding at Draw Ratio of 10)

The spinning dope composition prepared in Example 2 was defoamed while being aged at 55° C. for several hours, filtered using a stainless steel net (100-mesh, 250-mesh, 400-mesh), coagulated in a distilled water bath maintained at about 0 to 10° C. while being extruded and sprayed in an air layer (0.1~3 cm) through a spinneret, and then wound around a roller at a draw ratio of 10. A polyamide fiber was produced by sufficiently washing the resultant with distilled water and drying the resultant at 150° C. The fiber had a fineness of 1.8 denier, tensile strength of 19.0 g/d, elongation of 5.1%, and a tensile modulus (3%) of 410 g/d.

Preparation of Polyamide Fiber and Physical Properties Thereof (At the Time of Winding at Draw Ratio of 30)

The spinning dope composition prepared in Example 2 was defoamed while being aged at 55° C. for several hours, filtered using a stainless steel net (100-mesh, 250-mesh, 400-mesh), coagulated in a distilled water bath maintained at about 0 to 10° C. while being extruded and sprayed in an air layer (0.1~3 cm) through spinneret, and then wound around a roller at a draw ratio of 30. A polyamide fiber was produced by sufficiently washing the resultant with distilled water and drying the resultant at 150° C. The fiber had a fineness of 1.0 denier, tensile strength of 27.7 g/d, elongation of 3.9%, and a tensile modulus (3%) of 649 g/d.

COMPARATIVE EXAMPLE 1

Preparation of Polymer and Spinning Dope 10.064 g of 2,5-diaminobenzonitrile (DAN, 75.6 mmol) and 100 mL of DMAc were put into a 250 mL 4-neck round flask equipped with a stirrer under nitrogen atmosphere and then completely dissolved at room temperature. This solution was cooled to 0° C. using an ice bath. After 7.673 g of terephthaloyl chloride (TPC, 37.8 mmol) was primarily added to this solution and stirred for 1 minute, 7.673 g of TPC (37.8 mmol) was secondarily added thereto. At this time, while a viscosity was rapidly increased, a gel-type solid was formed within 10 to 20 seconds. After this gel-type solid was ground using a mixer, 5.585 g of lithium carbonate ($Li_2CO_3$, 75.6 mmol) was added thereto, thereby obtaining a spinning dope composition (poly(2,5-diaminobenzonitrile-terephthalamide)) with silver white gloss within 1 hour while neutralizing HCl generated during a reaction.

As a result of analyzing the obtained gel-type solid by the same method as in Example 1, it may be appreciated that a polyamide polymer having a weight average molecular weight of 4,100,000 g/mol and molecular weight distribution of 6.48 was obtained, and as a result of confirming the obtained polyamide polymer using a polarized optical microscope (POM), it may be appreciated that the polymer exhibited a Schlieren texture of a nematic liquid crystal phase.

Preparation of Polyamide Fiber and Physical Properties Thereof (At the Time of Winding at Draw Ratio of 10)

After the spinning dope composition prepared in Comparative Example 1 was defoamed while being aged at 55° C. for several hours, filtered using a stainless steel net (100-mesh, 250-mesh, 400-mesh), an attempt of coagulating the spinning dope composition in a distilled water bath maintained at about 0 to 10° C. while extruding and spraying the spinning dope composition in an air layer (0.1~3 cm) through a spinneret, and then winding the coagulated composition around a roller at a draw ratio of 10 was conducted. However, in the spinning dope composition prepared in Comparative Example 1, spinnability capable of obtaining a polyamide fiber having an effective length was significantly deteriorated as compared to Examples, and a surface of the fiber was not uniform. Even though the polyamide fiber having an effective length was obtained, the composition was not spun at a draw ratio of 10 or more. That is, in the cases in which the draw ratios were 12, 15, and 30, respectively, it was impossible to draw the fiber so as to have an effective length. In addition, some of the fibers of which breakage was generated were dyed with the same dye as that in Example 1, and as a result, it may be observed that the dyeing was not suitably performed and paper was stained with the dye of the dyed fiber.

EXAMPLE 3

9.500 g of 2,5-diaminobenzonitrile (DAN, 71.3 mmol), 0.568 g of 2,5-diaminobenzamide (DAA, 3.76 mmol), and 100 mL of DMAc were put into a 250 mL 4-neck round flask equipped with a stirrer under nitrogen atmosphere and then completely dissolved at room temperature. This solution was cooled to 0° C. using an ice bath. After 7.624 g of terephthaloyl chloride (TPC, 37.6 mmol) was added to this solution and stirred for 1 minute, 7.624 g of TPC (37.6 mmol) was additionally added thereto.

At this time, while a viscosity was rapidly increased, a gel-type solid was formed within 10 to 20 seconds. After this gel-type solid was ground using a mixer, 5.549 g of lithium carbonate ($Li_2CO_3$, 75.1 mmol) was added thereto, thereby obtaining a spinning dope composition with silver white gloss within 1 hour while neutralizing HCl generated during a reaction.

Figure 3:
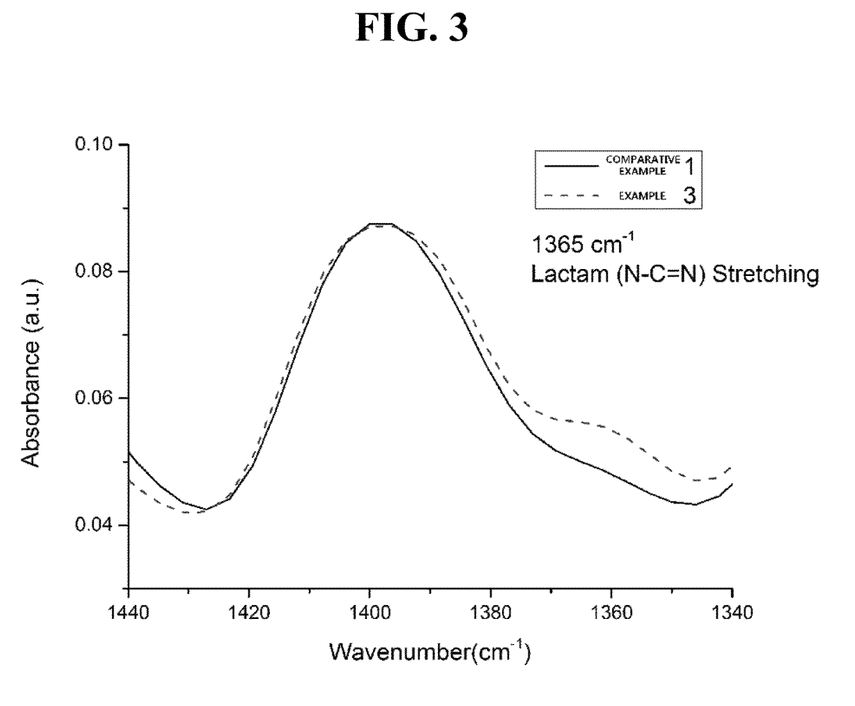
FIG. 3 shows infrared absorbance spectra of spinning dope composition in Comparative Example 1 and Example 3.

The spinning dope compositions of Example 3 and Comparative Example 1 was immersed in distilled water, sequentially washed with methanol and acetone, and dried. Then, absorbance of the dried dope compositions were measured using an infrared spectrometer (FIG. 3). As a result, it was confirmed that in Example 3, a peak was increased at 1365 $cm^{-1}$, which is an N—C=N stretching zone of a lactam peak, such that it was confirmed that a quinazolinone structure was formed and a poly(2,5-diaminobenzonitrile-terephthalamide-co-2,5-diaminobenzamide-terephthalamide-co-4-quinazolinone amide) structure (Chemical Formula 6) was formed. Meanwhile, as a result of analyzing the gel-type solid in which the lithium salt was not added, the quinazolinone structure as described above was not confirmed. It is thought that in the case of adding the lithium salt to prepare a spinning dope, this ring is formed. As a result of analyzing the obtained gel-type solid by the same method as in Example 1, it may be appreciated that a polyamide polymer having a weight average molecular weight of 3,120,000 g/mol and weight distribution of 5.22 was obtained.

Preparation of Polyamide Fiber and Physical Properties Thereof (At the Time of Winding at Draw Ratio of 10)

The spinning dope composition prepared in Example 3 was defoamed while being aged at 55° C. for several hours, filtered using a stainless steel net (100-mesh, 250-mesh, 400-mesh), coagulated in a distilled water bath maintained at about 0 to 10° C. while being extruded and sprayed in an air layer (0.1~3 cm) through a spinneret, and then wound around a roller at a draw ratio of 10. A polyamide fiber was produced by sufficiently washing the resultant with distilled water and drying the resultant at 150° C. The fiber had a fineness of 2.3 denier, tensile strength of 14.3 g/d, elongation of 6.1%, and a tensile modulus (3%) of 394 g/d.

Preparation of Polyamide Fiber and Physical Properties Thereof (At the Time of Winding at Draw Ratio of 30)

The spinning dope composition prepared in Example 3 was defoamed while being aged at 55° C. for several hours, filtered using a stainless steel net (100-mesh, 250-mesh, 400-mesh), coagulated in a distilled water bath maintained at about 0 to 10° C. while being extruded and sprayed in an air layer (0.1~3 cm) through a spinneret, and then wound around a roller at a draw ratio of 30. A polyamide fiber was produced by sufficiently washing the resultant with distilled water and drying the resultant at 150° C. The fiber had a fineness of 1.5 denier, tensile strength of 24.5 g/d, elongation of 4.2%, and a tensile modulus (3%) of 535 g/d.

EXAMPLE 4

Preparation of Polymer and Spinning Dope 10.034 g of 2,5-diaminobenzonitrile (DAN, 75.4 mmol), 0.03428 g of 2,5-diaminobenzamide (DAA, 0.227 mmol), and 100 mL of NMP were put into a 250 mL 4-neck round flask equipped with a stirrer under nitrogen atmosphere and then completely dissolved at room temperature. This solution was cooled to 0° C. using an ice bath.

After 7.673 g of terephthaloyl chloride (TPC, 37.8 mmol) was primarily added to this solution and stirred for 1 minute, 7.673 g of TPC (37.8 mmol) was additionally added thereto. At this time, while a viscosity was rapidly increased, a gel-type solid was formed within 10 to 20 seconds.

After this gel-type solid was ground using a mixer, 5.585 g of lithium carbonate ($Li_2CO_3$, 75.6 mmol) was added thereto, thereby obtaining a flowable spinning dope composition with silver white gloss within 1 hour while neutralizing HCl generated during a reaction.

As a result of analyzing the obtained gel-type solid by the same method as in Example 1, it may be appreciated that a polyamide polymer having a weight average molecular weight of 4,150,000 g/mol and molecular weight distribution of 5.95 was obtained, and as a result of confirming the obtained polyamide polymer using a polarized optical microscope (POM), it may be appreciated that the polymer exhibited a Schlieren texture of a nematic liquid crystal phase.

Preparation of Polyamide Fiber and Physical Properties Thereof (At the Time of Winding at Draw Ratio of 10)

The spinning dope composition prepared in Example 4 was defoamed while being aged at 55° C. for several hours, filtered using a stainless steel net (100-mesh, 250-mesh, 400-mesh), coagulated in a distilled water bath maintained at about 0 to 10° C. while being extruded and sprayed in an air layer (0.1~3 cm) through a spinneret, and then wound around a roller at a draw ratio of 10. A polyamide fiber was produced by sufficiently washing the resultant with distilled water and drying the resultant at 150° C. The fiber had a fineness of 1.7 denier, tensile strength of 18.6 g/d, elongation of 4.8%, and a tensile modulus (3%) of 457 g/d.

Preparation of Polyamide Fiber and Physical Properties Thereof (At the Time of Winding at Draw Ratio of 30)

The spinning dope composition prepared in Example 4 was defoamed while being aged at 55° C. for several hours, filtered using a stainless steel net (100-mesh, 250-mesh, 400-mesh), coagulated in a distilled water bath maintained at about 0 to 10° C. while being extruded and sprayed in an air layer (0.1~3 cm) through a spinneret, and then wound around a roller at a draw ratio of 30. A polyamide fiber was produced by sufficiently washing the resultant with distilled water and drying the resultant at 150° C. The fiber had a fineness of 1.1 denier, tensile strength of 27.5 g/d, elongation of 3.7%, and a tensile modulus (3%) of 631 g/d.

EXAMPLE 5

Preparation of Polymer and Spinning Dope 9.000 g of 2,5-diaminobenzonitrile (DAN, 67.6 mmol), 0.788 g of 1,4-diaminobenzene (DAB, 7.29 mmol), 0.03406 g of 2,5-diaminobenzamide (DAA, 0.225 mmol), and 100 mL of DMAc were put into a 250 mL 4-neck round flask equipped with a stirrer under nitrogen atmosphere and then completely dissolved at room temperature. This solution was cooled to 0° C. using an ice bath.

After 7.624 g of terephthaloyl chloride (TPC, 37.6 mmol) was primarily added to this solution and stirred for 1 minute, 7.624 g of TPC (37.6 mmol) was additionally added thereto. At this time, while a viscosity was rapidly increased, a gel-type solid was formed within 10 to 20 seconds.

After this gel-type solid was ground using a mixer, 5.549 g of lithium carbonate ($Li_2CO_3$, 75.1 mmol) was added thereto, thereby obtaining a flowable spinning dope composition with silver white gloss within 1 hour while neutralizing HCl generated during a reaction.

As a result of analyzing the obtained gel-type solid by the same method as in Example 1, it may be appreciated that a polyamide polymer having a weight average molecular weight of 5,080,000 g/mol and molecular weight distribution of 6.28 was obtained, and as a result of confirming the obtained polyamide polymer using a polarized optical microscope (POM), it may be appreciated that the polymer exhibited a Schlieren texture of a nematic liquid crystal phase.

Preparation of Polyamide Fiber and Physical Properties Thereof (At the Time of Winding at Draw Ratio of 10)

The spinning dope composition prepared in Example 5 was defoamed while being aged at 55° C. for several hours, filtered using a stainless steel net (100-mesh, 250-mesh, 400-mesh), coagulated in a distilled water bath maintained at about 0 to 10° C. while being extruded and sprayed in an air layer (0.1~3 cm) through a spinneret, and then wound around a roller at a draw ratio of 10. A polyamide fiber was produced by sufficiently washing the resultant with distilled water and drying the resultant at 150° C. The fiber had a fineness of 2.0 denier, tensile strength of 17.4 g/d, elongation of 5.2%, and a tensile modulus (3%) of 402 g/d.

Preparation of Polyamide Fiber and Physical Properties Thereof (At the Time of Winding at Draw Ratio of 30)

The spinning dope composition prepared in Example 5 was defoamed while being aged at 55° C. for several hours, filtered using a stainless steel net (100-mesh, 250-mesh, 400-mesh), coagulated in a distilled water bath maintained at about 0 to 10° C. while being extruded and sprayed in an air layer (0.1~3 cm) through a spinneret, and then wound around a roller at a draw ratio of 30. A polyamide fiber was produced by sufficiently washing the resultant with distilled water and drying the resultant at 150° C. The fiber had a fineness of 1.3 denier, tensile strength of 25.3 g/d, elongation of 4.1%, and a tensile modulus (3%) of 562 g/d.

EXAMPLE 6

Preparation of Polymer and Spinning Dope 13.000 g of 4,4'-diamino-6'-cyanobenzanilide, (DACaB, 51.5 mmol), 0.0419 g of 4,4'-diamino-6'-carbamoylbenzanilide, (DACyB, 0.155 mmol), and 100 mL of DMAc were put into a 250 mL 4-neck round flask equipped with a stirrer under nitrogen atmosphere and then completely dissolved at room temperature. This solution was cooled to 0° C. using an ice bath.

After 5.247 g of terephthaloyl chloride (TPC, 25.8 mmol) was primarily added to this solution and stirred for 1 minute, 5.247 g of TPC (25.8 mmol) was additionally added thereto. At this time, while a viscosity was rapidly increased, a gel-type solid was formed within 10 to 20 seconds.

After this gel-type solid was ground using a mixer, 3.819 g of lithium carbonate ($Li_2CO_3$, 51.7 mmol) was added thereto, thereby obtaining a flowable spinning dope composition with silver white gloss within 1 hour while neutralizing HCl generated during a reaction.

As a result of analyzing the obtained gel-type solid by the same method as in Example 1, it may be appreciated that a polyamide polymer having a weight average molecular weight of 4,680,000 g/mol and molecular weight distribution of 5.42 was obtained, and as a result of confirming the obtained polyamide polymer using a polarized optical microscope (POM), it may be appreciated that the polymer exhibited a Schlieren texture of a nematic liquid crystal phase.

Preparation of Polyamide Fiber and Physical Properties Thereof (At the Time of Winding at Draw Ratio of 10)

The spinning dope composition prepared in Example 6 was defoamed while being aged at 55° C. for several hours, filtered using a stainless steel net (100-mesh, 250-mesh, 400-mesh), coagulated in a distilled water bath maintained at about 0 to 10° C. while being extruded and sprayed in an air layer (0.1~3 cm) through a spinneret, and then wound around a roller at a draw ratio of 10. A polyamide fiber was produced by sufficiently washing the resultant with distilled water and drying the resultant at 150° C. The fiber had a fineness of 1.8 denier, tensile strength of 18.2 g/d, elongation of 4.2%, and a tensile modulus (3%) of 465 g/d.

Preparation of Polyamide Fiber and Physical Properties Thereof (At the Time of Winding at Draw Ratio of 30)

The spinning dope composition prepared in Example 6 was defoamed while being aged at 55° C. for several hours, filtered using a stainless steel net (100-mesh, 250-mesh, 400-mesh), coagulated in a distilled water bath maintained at about 0 to 10° C. while being extruded and sprayed in an air layer (0.1~3 cm) through a spinneret, and then wound around a roller at a draw ratio of 30. A polyamide fiber was produced by sufficiently washing the resultant with distilled water and drying the resultant at 150° C. The fiber had a fineness of 1.2 denier, tensile strength of 26.3 g/d, elongation of 3.6%, and a tensile modulus (3%) of 624 g/d.

EXAMPLE 7

Preparation of Polymer and Spinning Dope 5.585 g of lithium carbonate ($Li_2CO_3$, 75.6 mmol) and 100 mL of DMAc were put into a 250 mL 4-neck round flask equipped with a stirrer under nitrogen atmosphere and then stirred at 70° C. for 3 hours. After cooling the resultant to room temperature, 10.034 g of 2,5-diaminobenzonitrile (75.4 mmol) and 0.03428 g of 2,5-diaminobenzamide (0.227 mmol) were added thereto. This solution was cooled to 0° C. using an ice bath.

After 7.673 g of terephthaloyl chloride (TPC, 37.8 mmol) was primarily added to this solution and stirred for 1 minute, 7.673 g of TPC (37.8 mmol) was additionally added thereto. At this time, a viscosity was rapidly increased while air bubbles were formed within 10 to 60 seconds by neutralization, and a flowable spinning dope composition with silver white gloss was obtained by stirring for 1 hour.

As a result of analyzing the obtained gel-type solid by the same method as in Example 1, it may be appreciated that a polyamide polymer having a weight average molecular weight of 3,950,000 g/mol and molecular weight distribution of 6.34 was obtained, and as a result of confirming the obtained polyamide polymer using a polarized optical microscope (POM), it may be appreciated that the polymer exhibited a Schlieren texture of a nematic liquid crystal phase.

Preparation of Polyamide Fiber and Physical Properties Thereof (At the Time of Winding at Draw Ratio of 10)

The spinning dope composition prepared in Example 7 was defoamed while being aged at 55° C. for several hours, filtered using a stainless steel net (100-mesh, 250-mesh, 400-mesh), coagulated in a distilled water bath maintained at about 0 to 10° C. while being extruded and sprayed in an air layer (0.1~3 cm) through a spinneret, and then wound around a roller at a draw ratio of 10. A polyamide fiber was produced by sufficiently washing the resultant with distilled water and drying the resultant at 150° C. The fiber had a fineness of 2.0 denier, tensile strength of 17.6 g/d, elongation of 4.8%, and a tensile modulus (3%) of 397 g/d.

Preparation of Polyamide Fiber and Physical Properties Thereof (At the Time of Winding at Draw Ratio of 30)

The spinning dope composition prepared in Example 7 was defoamed while being aged at 55° C. for several hours, filtered using a stainless steel net (100-mesh, 250-mesh, 400-mesh), congealed in a distilled water bath maintained at about 0 to 10° C. while being extruded and sprayed in an air layer (0.1~3 cm) through a spinneret, and then wound around a roller at a draw ratio of 30. A polyamide fiber was produced by sufficiently washing the resultant with distilled water and drying the resultant at 150° C. The fiber had a fineness of 1.3 denier, tensile strength of 25.5 g/d, elongation of 3.3%, and a tensile modulus (3%) of 608 g/d.

COMPARATIVE EXAMPLE 2

Preparation of Polymer and Spinning Dope 11.400 g of 2,5-diaminobenzamide (DAA, 75.4 mmol) and 100 mL of DMAc were put into a 250 mL 4-neck round flask equipped with a stirrer under nitrogen atmosphere and then completely dissolved at room temperature. This solution was cooled to 0° C. using an ice bath. After 7.655 g of terephthaloyl chloride (TPC, 37.7 mmol) was primarily added to this solution and stirred for 1 minute, 7.655 g of TPC (37.7 mmol) was secondarily added thereto. At this time, while a viscosity was rapidly increased, a gel-type solid was formed within 10 to 20 seconds. After this gel-type solid was ground using a mixer, 5.572 g of lithium carbonate ($Li_2CO_3$, 75.4 mmol) was added thereto, thereby obtaining a spinning dope composition (poly(2,5-diaminobenzamide-terephthalamide)) with silver white gloss within 1 hour while neutralizing HCL generated during a reaction.

As a result of analyzing the obtained gel-type solid by the same method as in Example 1, it may be appreciated that a polyamide polymer having a weight average molecular weight of 5,670,000 g/mol and molecular weight distribution of 6.75 was obtained, and as a result of confirming the obtained polyamide polymer using a polarized optical microscope (POM), it may be appreciated that the polymer was isotropic. Therefore, it was confirmed that the spinning was not smoothly performed and a breakage occurred. Actually, it was impossible to spin the polyamide polymer.

As a result, as compared to Comparative Example 1 in which a monomer substituted with —$CONH_2$ functional group was not copolymerized, the polyamide polymers in Examples 1 to 7 in which the monomer substituted with —$CONH_2$ functional group was copolymerized had excellent spinnability due to the amide and quinazolinone functional groups existing in the polymer, and the spinning may be performed at a draw ratio of 10 or more, preferably, 15 or more, more preferably, 30 or more, or 50, such that it may be appreciated that the polyamide polymers in Examples 1 to 7 had an excellent drawing property. In addition, tensile strength of the drawn fiber was significantly excellent (25 g/d or more), and more preferably, fiber having tensile strength of 30 g/d may be prepared. Further, it may be appreciated that when the fiber was drawn 30 time or more, in all of the polyamide fibers, the tensile modulus was 500 g/d or more, such the physical properties thereof were significantly improved. The draw ratio means a ratio of a rate of a filament passing through a coagulation bath at the time of drawing to an initial rate at which extrudates passing through a spinneret were not drawn at the time of spinning a spinning dope composition.

INDUSTRIAL APPLICABILITY

A novel polyamide polymer according to the present invention has a structure including a CN functional group and a $CONH_2$ functional group, and a fiber using a spinning dope composition containing the polyamide polymer may have significantly excellent strength and elastic force as compared to a fiber according to the related art.

The fiber may be strong against exposure to UV light, or the like, for a long time due to this structure, and even in the case in which the fiber is used for a long time, dynamic performance of the fiber is not deteriorated by hydrolysis, such that durability may be excellent.

In addition, at the time of spinning using a spinning dope according to the present invention, a draw ratio of 10 or more, preferably 20 or more, and more preferably 30 or more may be implemented, such that a high-glossy fiber may be produced.

In addition, the polymer according to the present invention may be dyed using a dye, such that fibers having various colors may be produced, and the polymer may be applied to various fields requiring high strength and high performance.

The invention claimed is:

1. A polyamide polymer comprising:
   (a) one or two or more selected from aromatic diamine monomers represented by the following Chemical Formula (1);
   (b) one or two or more selected from aromatic diamine monomers represented by the following Chemical Formula (2); and
   (c) one or two or more selected from aromatic dibasic organic acid derivative monomers represented by the following Chemical Formula 3:

$H_2N-Ar_1(CONH_2)_a-NH_2$ (Chemical Formula 1)

$H_2N-Ar_2(CN)_b-NH_2$ (Chemical Formula 2)

$X-CO-Ar_3-CO-X$ (Chemical Formula 3)

wherein, $Ar_1$, $Ar_2$, and $Ar_3$ are each independently a substituted or unsubstituted ($C_6$~$C_{34}$) aromatic group or $-Ar_4-Z-Ar_5-$, $Ar_4$ and $Ar_5$ are a substituted or unsubstituted ($C_6$~$C_{34}$) aromatic group, Z is a single bond, $-CO-$, $-COO-$, $-SO_2-$, $-SO-$, or a substituted or unsubstituted ($C_1$~$C_{10}$) straight or branched alkylene group, X is hydroxyl, halogen, or a ($C_1$~$C_4$) alkoxy group, and a and b are each independently integers of 1 to 4.

2. The polyamide polymer of claim 1, wherein at least one of $-CONH_2$ substituents of Chemical Formula 1 is substituted at an ortho-position of a primary amine group of the aromatic diamine monomer represented by Chemical Formula 1.

3. The polyamide polymer of claim 1, wherein the aromatic diamine monomer represented by Chemical Formula 1 and the aromatic diamine monomer represented by Chemical Formula 2 are polymerized at a ratio of 0.001 to 50mol %: 99.99 to 50mol %.

4. The polyamide polymer of claim 3, wherein the diamine monomer further includes a diamine monomer that does not have $-CN$ and $-CONH_2$ substituents at a molar ratio of 0.01 to 0.5 based on 1 mole of the entire monomers represented by Chemical Formulas 1 and 2.

5. The polyamide polymer of claim 2, wherein the aromatic diamine monomer having the $-CONH_2$ substituent represented by Chemical Formula 1 is one or more selected from compounds represented by the following Structural Formulas.

A is $-H$, $-Cl$, $-Br$, $-I$, $-NO_2$, $-CN$, or an alkyl or alkoxy group having 1 to 4 carbon atoms, and B is $-CO-$, $-COO-$, $-SO_2-$, $-SO-$, or an ($C_1$~$C_{10}$) straight or branched alkylene group.

6. The polyamide polymer of claim 1, wherein the aromatic diamine monomer having a nitrile group of Chemical Formula 2 is any one selected from compounds represented by the following Structural Formulas:

A is $-H$, $-Cl$, $-Br$, $-I$, $-NO_2$, $-CN$, $-CONH_2$, or an alkyl or alkoxy group having 1 to 4 carbon atoms, and B is $-CO-$, $-COO-$, $-SO_2-$, $-SO-$, or an ($C_1$~$C_4$) straight or branched alkylene group.

7. The polyamide polymer of claim 1, wherein the aromatic dibasic organic acid derivative monomer represented by Chemical Formula 3 is selected from terephthalic acid, ($C_1$~$C_4$) terephthalate, or terephthaloyl halide.

8. A polyamide polymer comprising:
   (a) one or two or more selected from aromatic diamine monomers represented by the following Chemical Formula (1);

(b) one or two or more selected from aromatic diamine monomers represented by the following Chemical Formula (2); and
(c) one or two or more selected from aromatic dibasic organic acid derivative monomers represented by the following Chemical Formula 3:

$$H_2N-Ar_1(CONH_2)_a-NH_2 \quad \text{(Chemical Formula 1)}$$

$$H_2N-Ar_2(CN)_b-NH_2 \quad \text{(Chemical Formula 2)}$$

$$X-CO-Ar_3-CO-X \quad \text{(Chemical Formula 3)}$$

wherein, $Ar_1$, $Ar_2$, and $Ar_3$ are each independently a substituted or unsubstituted ($C_6$~$C_{34}$) aromatic group or —$Ar_4$—Z—$Ar_5$—, $Ar_4$ and $Ar_5$ are a substituted or unsubstituted ($C_6$~$C_{34}$) aromatic group, Z is a single bond, —C(O)NH—, —NH—C(O)—, —CO—, —COO—, —$SO_2$—, —SO— or a substituted or unsubstituted ($C_1$~$C_{10}$) straight or branched alkylene group, X is hydroxyl, halogen, or a ($C_1$~$C_4$) alkoxy group, and a and b are each independently integers of 1 to 4, wherein it includes a quinazolinone group represented by the following Chemical Formula (4)

[Chemical Formula 4]

9. The polyamide polymer of claim 1, wherein it is a polymer represented by the following Chemical Formula 5 in which l or m is a mole fraction and a ratio of l and m is 0.001~50 mol %: 99.99~50 mol %, and having a weight average molecular weight of 10,000 to 15,000,000

10. A polyamide polymer comprising:
(a) one or two or more selected from aromatic diamine monomers represented by the following Chemical Formula (1);
(b) one or two or more selected from aromatic diamine monomers represented by the following Chemical Formula (2); and
(c) one or two or more selected from aromatic dibasic organic acid derivative monomers represented by the following Chemical Formula 3 :

$$H_2N-Ar_1(CONH_2)_a-NH_2 \quad \text{(Chemical Formula 1)}$$

$$H_2N-Ar_2(CN)_b-NH_2 \quad \text{(Chemical Formula 2)}$$

$$X-CO-Ar_3-CO-X \quad \text{(Chemical Formula 3)}$$

wherein, $Ar_1$, $Ar_2$, and $Ar_3$ are each independently a substituted or unsubstituted ($C_6$~$C_{34}$) aromatic group or —$Ar_4$—Z—$Ar_5$—, $Ar_4$ and $Ar_5$ are a substituted or unsubstituted ($C_6$~$C_{34}$ ) aromatic group, Z is a single bond, —C(O)NH—, —NH—C(O)—, —CO—, —COO—, —$SO_2$—, —SO—, or a substituted or unsubstituted ($C_1$~$C_{10}$) straight or branched alkylene group, X is hydroxyl, halogen, or a ($C_1$~$C_4$) alkoxy group, and a and b are each independently integers of 1 to 4 , wherein it is a polymer including a quinazoli none group, represented by the following Chemical Formula 6 in which a ratio of l+n and m is 0.001~50 mol %: 99.99~50 mol %, and having a weight average molecular weight of 10,000 to 15,000,000:

[Chemical Formula 5]

[Chemical Formula 6]

l, n, and m are mole fractions.

11. The polyamide polymer of claim 1, wherein it includes a quinazolinone group represented by the following Chemical Formula (4)

[Chemical Formula 4]

12. The polyamide polymer of claim 1, wherein it is a polymer including a quinazolinone group, represented by the following Chemical Formula 6 in which a ratio of l+n and m is 0.001~50 mol %: 99.99~50 mol %, and having a weight average molecular weight of 10,000 to 15,000,000:

[Chemical Formula 6]

l, n, and m are mole fractions.

* * * * *